United States Patent Office 3,486,787
Patented Dec. 30, 1969

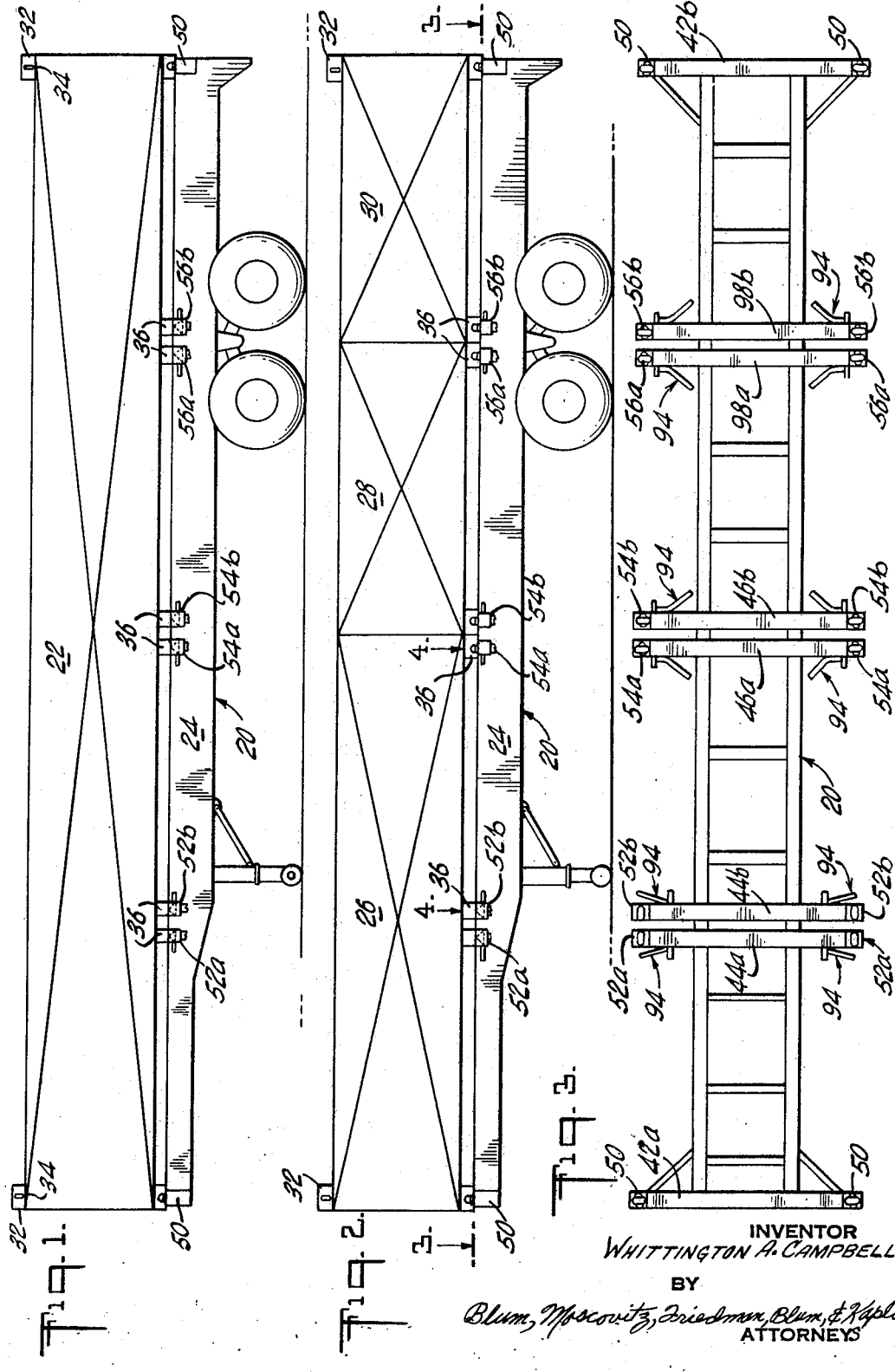

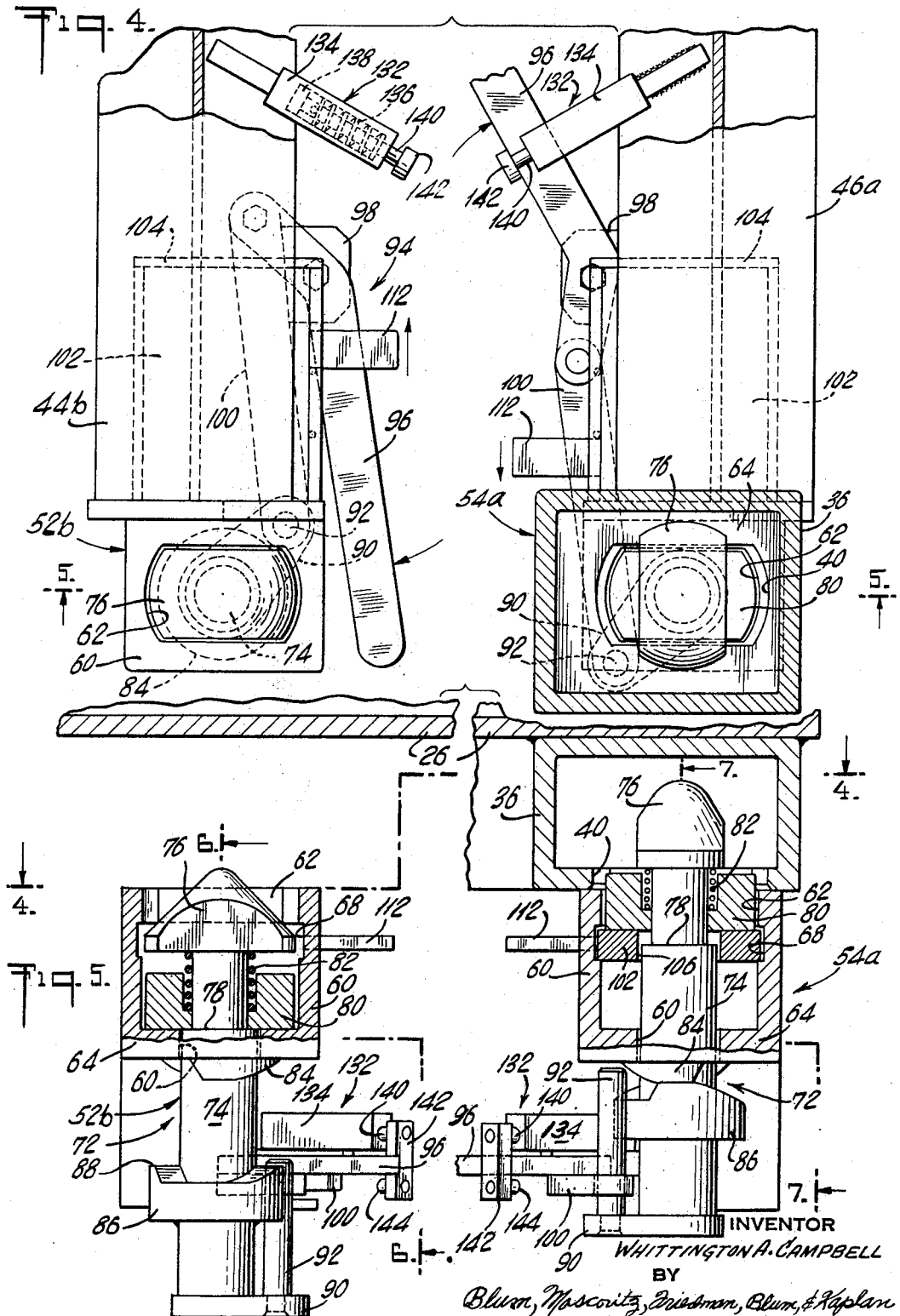

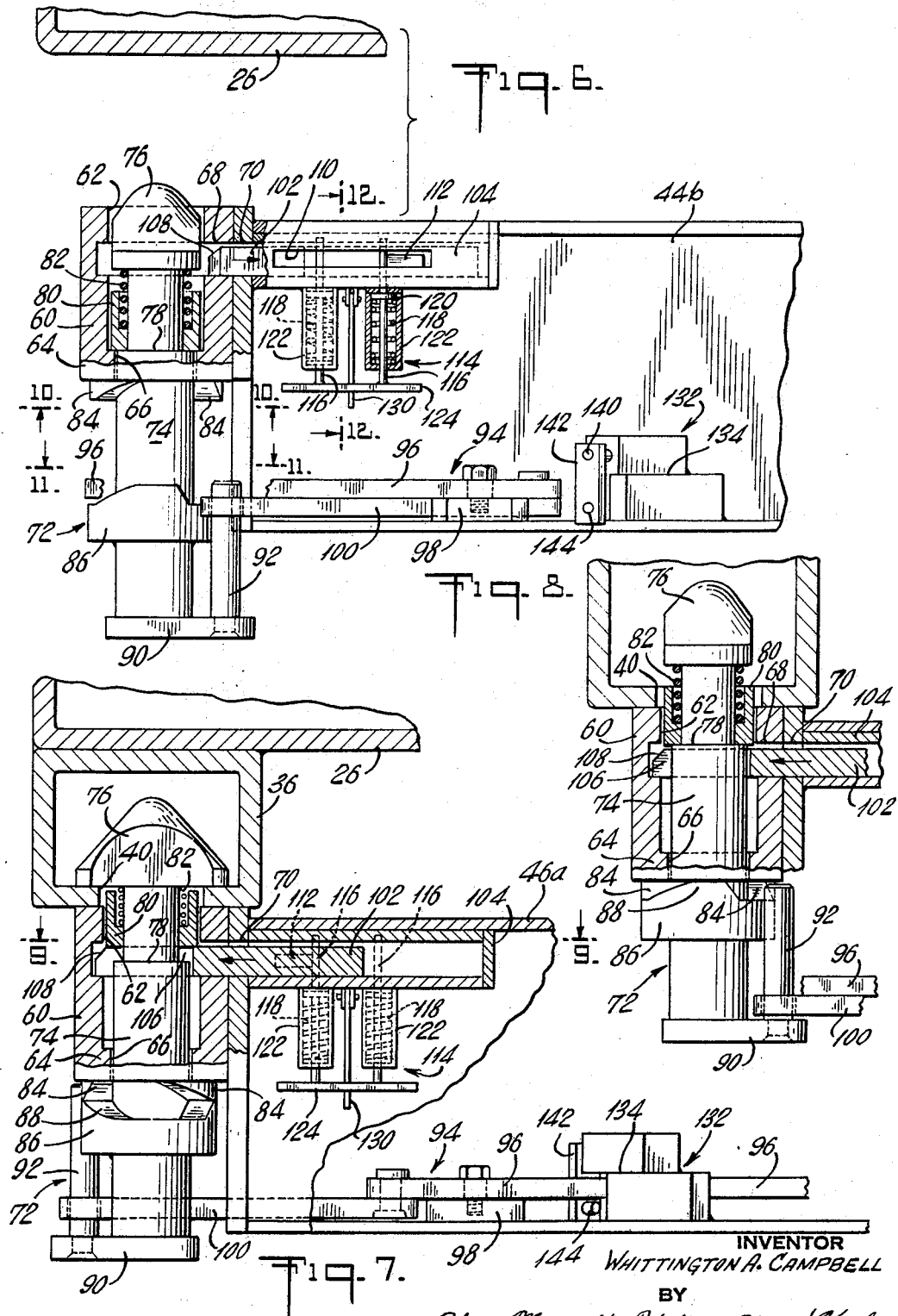

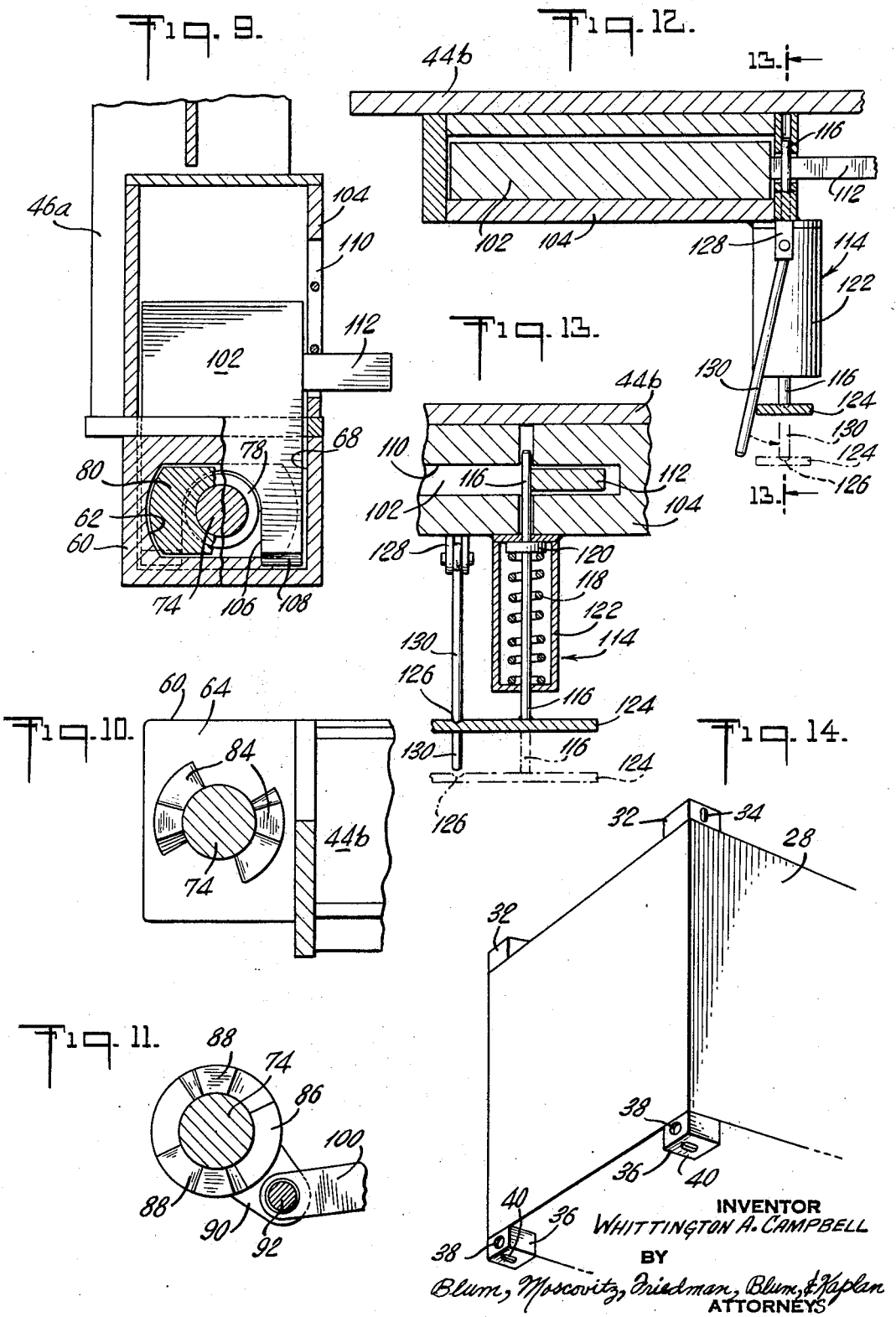

3,486,787
RETRACTABLE LOCK
Whittington A. Campbell, Sunbury, Pa., assignor to Trailco Manufacturing & Sales Co., Hummels Wharf, Pa., a corporation of Pennsylvania
Filed Oct. 9, 1967, Ser. No. 673,595
Int. Cl. B62d 27/06, 25/00
U.S. Cl. 296—35       3 Claims

ABSTRACT OF THE DISCLOSURE

A retractable lock adapted to be used, for example, on the outriggers of vehicles which carry containers, the retractable lock acting to releasably lock a container to the vehicle. The lock is retractable so that it can be displaced to a retracted position where it will not interfere with the movement of parts on the vehicle. The lock includes a rotary locking means which is axially displaceable between operative and retracted positions and which is turnable when in its operative position between locking and unlocking positions. A shiftable support means is shiftable between supporting and non-supporting positions, and when said support means is in its supporting position it coacts with the rotary lock means to support the latter in its operative position. When the support means is shifted to its non-supporting position, the rotary lock means is released for movement to its retracted position. A manually operable means coacts with the rotary lock means to turn the latter between its locking and unlocking positions.

BACKGROUND OF THE INVENTION

The present invention relates to releasable locking devices.

In particular, the present invention relates to that type of releasable locking device which is adapted to be used for locking containers on a vehicle which carries the containers.

As is well known, it is customary at the present time to transport relatively large loads in closed containers which may be 10 feet, 20 feet, or 30 feet long and such containers are customarily transported on vehicles in the form of trailer units which are 40 feet long, so that any combination of containers which will provide a total length of 40 feet can be transported on a single trailer unit. These containers are adapted to be releasably attached to outriggers of the bed or chassis of the trailer unit. The containers are customarily loaded at the point of shipment for unloading at a given destination without any loading or unloading in the interim. These containers are adapted to be mounted on railroad cars or on ships so that the load within the container can be shipped throughout the entire journey without any interim unpacking.

Because a plurality of containers the lengths of which are the same or different can be selectively grouped in end-to-end relation on any one trailer unit, it is necessary to provide each trailer unit with a number of outriggers and locking devices which will accommodate the largest number of containers. Thus, in the case of the 40 foot trailer unit referred to above, it is necessary to provide sufficient outriggers and locking devices to handle four ten foot units.

The conventional locking devices include locking elements which project at all times above the outriggers, and when the aggregation of containers on a given trailer unit is such that any outrigger, particularly those outriggers which are situated between the end outriggers, is not required to support a container, the locking element which nevertheless projects from such an outrigger interferes with the movement of parts freely over the trailer unit and creates unavoidable difficulties in connection with handling of the containers.

SUMMARY OF THE INVENTION

It is therefore a primary object of the present invention to provide a releasable lock structure which is capable of being retracted, when the lock structure is not used, to a position where it will not interfere with the movements which take place at the exterior of the locking structure.

In particular, it is an object of the invention to provide a locking structure which is adapted for use with a vehicle of the type referred to above in connection with the transportation of containers.

Furthermore, it is an object of the invention to provide a lock structure which is simple and rugged and which requires only simple convenient manipulations to carry out both the locking and unlocking operations as well as the release of the locking device for movement to its retracted position.

Also, it is an object of the invention to provide a construction capable of reliably maintaining the lock in its locking position.

In accordance with the invention the lock includes a rotary lock means having an axis about which it turns between locking and unlocking positions and along which it is axially movable between and operative and a retracted position. When the rotary lock means is in its operative position it can be turned between its locking and unlocking positions. A support means is shiftable between supporting and non-supporting positions, and when this support means is in its supporting position it coacts with the rotary lock means to support the latter in its operative position, while when the support means is shifted to its non-supporting position, the rotary lock means is released for movement to its retracted position. A manually operable means coacts with the rotary lock means to turn the latter between its locking and unlocking positions.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a schematic side elevation of a trailer unit carrying a single container whose length equals that of the trailer unit;

FIG. 2 is a side elevation of the trailer unit of FIG. 1 carrying a group of containers the total length of which is equal to the length of the trailer unit;

FIG. 3 is a schematic top plan view of the trailer unit of FIG. 2 with the containers removed therefrom, FIG. 3 schematically illustrating the positions of lock structures on outriggers of the illustrated trailer unit;

FIG. 4 is a fragmentary partly sectional plan view taken along line 4—4 of FIGS. 2 and 5 and showing details of the structure of the invention;

FIG. 5 is a sectional elevation taken along line 5—5 of FIG. 4 in the direction of the arrows;

FIG. 6 is a sectional elevation taken along line 6—6 of FIG. 5 in the direction of the arrows;

FIG. 7 is a sectional elevation taken along line 7—7 of FIG. 5 in the direction of the arrows;

FIG. 8 shows part of the structure of FIG. 6 in a different position;

FIG. 9 is a sectional plan view taken along line 9—9 of FIG. 7 in the direction of the arrows;

FIG. 10 is an upwardly directed sectional plan view taken along line 10—10 of FIG. 6 in the direction of the arrows;

FIG. 11 is a downwardly directed sectional plan view taken along line 11—11 of FIG. 6 in the direction of the arrows;

FIG. 12 is a transverse section of part of the structure of FIG. 6 taken along line 12—12 of FIG. 6 in the direction of the arrows;

FIG. 13 is a fragmentary sectional elevation taken along line 13—13 of FIG. 12 in the direction of the arrows; and FIG. 14 is a fragmentary schematic perspective illustration of an end of a container.

DESCRIPTION OF PREFERRED EMBODIMENTS

Referring now to FIG. 1, there is shown therein a trailer unit 20 which in the illustrated example has a length of forty feet. A single elongated container 22 which also has a length of forty feet is carried by the bed 24 of the trailer unit 20.

However, any group of containers which have lengths of ten feet, twenty feet or thirty feet, may be aggregated in end-to-end relation so that they have a total length of forty feet carried by a single trailer unit 20. Thus, in FIG. 2 three containers 26, 28 and 30 which are respectively twenty feet, ten feet and ten feet long, are situated in end-to-end relation on the trailer 20.

At their ends, all of the containers have an identical construction such as that shown in FIG. 14 for an end of the container 28. Thus, at the corners which are situated at the tops and bottoms of the containers at their ends there are upper castings 32 which are fixed to the containers and formed with elongated slots 34 capable of receiving hooks or the like of hoisting equipment for hoisting the containers so that they can be moved to and from predetermined locations such as to and from a trailer 20. Also, each container has at each end, at its bottom, a pair of castings 36 fixed to the container and provided with circular openings 38 also to be engaged by hooks or the like in connection with lifting of the containers, although these openings 38 may also coact with structures which serve to raise the containers only from the bottoms thereof. These castings 36 are formed at their bottom walls with elongated slots 40 which pass through these bottom walls and extend longitudinally of the containers, and it is through these slots 40 that the lock structure passes for releasably locking the containers to the vehicle in the manner described below.

As may be seen from FIG. 3, the bed 24 of the trailer 20 carries a plurality of outriggers which extend laterally beyond the opposed sides of the bed 24 and which terminate in outer ends distant from the bed 24. These outriggers include a pair of end outriggers 42a and 42b, as well as a series of intermediate outriggers 44a, 44b, 46a, 46b, 48a and 48b, and all of these outriggers carry lock structures at the regions of their outer ends. Thus, the end outriggers 42a and 42b carry at their ends conventional lock structures 50 which are always used since irrespective of the nature of the containers on the trailer unit they will always extend to the ends of the trailer unit and will always have to be locked to the end outriggers 42a and 42b. The outriggers 44a carries locks 52a of the invention respectively at the region of its outer ends, and in the same way the outrigger 44b carries locks 52b of the present invention at the region of its outer ends. The outrigger 46a similarly carries locks 54a of the invention, the outrigger 46b carries the locks 54b, the outrigger 48a carries the locks 56a, and the outrigger 48b carries the locks 56b, and all of these locks have a construction described below according to the present invention.

All of the locks of the invention are capable of being displaced between operative and retracted positions. When a single container 22 is carried by the trailer, as shown in FIG. 1, all of the locks of the invention are retracted so that they will not interfere with manipulations in connection with handling of the container 22. On the other hand, when a group of four containers each of which has a length of ten feet is carried by the trailer, then all of the locks of the invention will be used and will be in their operative positions. However, when a combination such as that shown in FIG. 2 is carried by the trailer, where at least one container is longer than ten feet, then those locks of the invention which are not required are retracted. Thus, with the particular arrangement of the containers shown in FIG. 2, the locks 54a, 54b, 56a, and 56b of the invention are all required, while the locks 52a and 52b are retracted.

While the detailed description below refers to the details of the locks 52b and 54a which are visible in FIG. 2, it is to be understood that all of the locks have an identical construction. These particular locks are chosen for further detailed illustration because in the example of FIG. 2 the lock 52b is in its retracted position and the lock 54a is in its operative position.

Referring to FIGS. 4 and 5, each of the lock structures 52b and 54a includes a housing means 60 having a top open end 62 and a bottom wall 64 formed with an opening 66 passing therethrough. Each of these housings is fixed to the outer end of the outrigger which carries it. As is apparent from FIGS. 4 and 6, the outriggers are in the form of I-beams, and the housings may be welded, for example to the ends of the I-beams. The side walls of each housing 60 are formed with horizontally extending grooves 68, except for that side wall which is directly fixed to the end of the I-beam of the outrigger, and this latter wall is formed with a horizontal slot 70 (FIG. 7) passing therethrough for a purpose described below.

Each lock structure of the invention includes a rotary lock means 72 having an elongated shank 74 which may be of circular cross section and which passes freely through the opening 66, and each rotary lock means 72 has an upper locking end 76 which is of T-shaped configuration, as is apparent particularly from FIG. 5. The shank 74 of each rotary lock means 72 is formed intermediate its ends with an upwardly directed shoulder 78 (FIG. 5), and a ring 80 is adapted to rest on this shoulder 78 during axial movement of the shank 74, although the ring 80 can be displaced upwardly from the shoulder 78 to the elevation shown in FIG. 5 for the right lock 54a, for a purpose described below. A coil spring 82 surrounds the upper portion of the shank 74 which is of smaller diameter and pressures against the head end 76 and the ring 80 so as to urge the head end 76 upwardly away from the ring 80.

The housing 60 fixedly carries at its bottom surface a stationary cam 84 which, as is shown in FIG. 10, includes a pair of arcuate portions extending around and situated at diametrically opposed parts of the shank 74, and the stationary cam structure 84 has in side elevation the configuration most clearly shown in FIG. 5.

The shank 74 fixedly carries a cam ring 86 having at its upper edge a rotary cam structure 88 which turns with the shank 74 and which coacts with the stationary cam 84 in a manner described below. The pair of cams 88 are adapted to be received initially in the spaces between the pair of cams 84.

At its bottom non-locking end, the shank 74 fixedly carries a projection 90 which extends laterally to one side of the shank so as to form a lever, and this projection 90 fixedly carries a pin 92 of a connecting means described in greater detail below. This pin 92 extending upwardly from the projection 90 parallel to and spaced from the shank 74.

The connecting means which is formed in part by the pin 92 serves to connect with the rotary lock means 72 a manually operable means 94 in the form of a manually operable linkage capable of being manipulated to turn the rotary lock means between the unlocked position thereof shown in FIG. 8, where the rotary lock means is shown in its operative position, and the locked position thereof shown in FIG. 7. The manually operable means 94 includes a lever in the form of an elongated handle member 96 pivotally supported for swinging movement about a vertical axis on a suitable bracket 98 carried by the lower web of the outrigger. The outer end of the lever 96 is accessible to the operator while the inner end thereof is pivotally connected with a link 100 which is formed at its opposite end with an opening through which the pin 92 freely passes, so that this latter end of the link 100 and the pin 92 form the connecting means which connects the manually operable means 96 to the rotary lock means 72. This operative connection is maintained at all times.

Assuming that the lock is in its retracted position shown for the lock 52b in FIGS. 4 and 5 and that it is desired to displace the rotary lock means 72 upwardly to its operative position shown for the lock 54a in FIGS. 4 and 5, then the operator simply will manually raise the shank 74 by engaging the bottom end thereof, and the rotary lock means 72 will now have the elevation shown in FIG. 8 where the pin 92 has been displaced upwardly with respect to the link 100 of the manually operable means 94. At this time it will be noted that the cams 88 are situated in the spaces between the stationary cams 84. The size and direction of the T-shaped end 76 of the rotary lock means 72 is such that during its upward movement it can be displaced through the elongated opening 40 at the bottom end of the casting 36 which is indicated in FIG. 5 fixed to the container 26. Thus, when the lock means 72 has been raised to the position of FIG. 8 the T-shaped upper locking end 76 thereof will be situated within the casting 36 over the bottom wall thereof.

When the rotary lock means has thus been displaced from its retracted position to its upper operative position, the operator can manipulate the manually operable means 94 so as to swing the handle 96 rearwardly, thus bringing about a turning of the lock means 72 from its unlocking position to its locking position where the T-shaped end 76 extends transversely across and beyond the slot 40, and at the same time the cams 88 will move along the stationary cams 84 to cam the upper end 76 of the lock member downwardly against the inner surface of the bottom wall of the casting 36 so as to reliably lock the latter on the outrigger.

A shiftable support means is provided to be shiftable to a supporting position where it supports the rotary lock means 72 when it is in its upper operative position, this shiftable support means also being shiftable to a non-supporting position where it releases the lock means for retracting movement. This shiftable support means includes a support plate 102 shown most clearly in FIG. 9. This plate 102 is supported for horizontal shifting movement in a housing 104 fixed directly to the outrigger and this housing 104 is open at its left end, as viewed in FIGS. 6 and 7, so that this left open end of the housing is in register with the slot 70, thus enabling the plate 102 to be shifted between the non-supporting position thereof indicated in FIG. 6 and the supporting position thereof indicated in FIG. 7. At its end which enters into the housing 60, the support plate 102 is formed with a notch 106 capable of receiving the shank 74, and at its leading end the plate 102 has a bevel 108 at its upper edge. The housing 104 is provided at its outer side wall with an elongated slot 110 which extends horizontally and through which a handle 112 projects, this handle being fixed to the plate 102 so that the handle 112 may be manipulated to shift the plate 102 between the positions of FIG. 6 and FIG. 7, respectively. Thus, when the operator manually raises the shank 74 to the elevation of FIG. 8, the operator will shift the handle 112 toward the outer end of the outrigger so as to displace the plate 102 beneath the ring 80 engaging and raising the latter slightly beyond the shoulder 78 of the shank 74, and thus this support means when in its supporting position will hold the lock means raised in its operative position and will absorb the force which is directed downwardly against the ring 80 during compression of the spring 82, this force in turn being transmitted from the plate 102 to the housing 60 since the plate 102 is guided for movement in the grooves 68 thereof. From the housing 60 this force is of course absorbed by the outrigger itself.

When it is desired to displace the lock to its unlocked position the manually operable means 94 is returned to the position shown for the lock 52b in FIG. 4, and in order to retract the lock it is only necessary to return the plate 102 from the position of FIG. 7 to that of FIG. 6, thus permitting the rotary lock means to drop by gravity into the housing 60 so as to automatically assume its retracted position. In this way a gravitational retraction of the lock means of the invention is brought about.

In order to reliably maintain the plate 102 in the non-supporting and supporting positions respectively illustrated in FIGS. 6 and 7, a releasable holding means 114 is provided. This releasable holding means 114 includes a pair of rods 116 which extend vertically and which are urged upwardly by a spring means formed by springs 118 (FIG. 6). When the lock means is in its non-supporting position of FIG. 6, both of the rods 116 are on one side of the handle 112, while when the support means is in its supporting position shown in FIG. 7 both of the rods 116 are on the opposite side of the handle 112, as indicated in phantom lines in FIG. 7, so that in this way these rods act to reliably maintain the support means in either one of its positions. The rods 116 fixedly carry pistons 120 which are slidable in cylinders 122 which accommodate the springs 118 and these springs act on the pistons 120 to urge the rods 116 upwardly through openings in the bottom wall of the housing 104, these openings communicating with slot 110, as is indicated in FIG. 9. The bottom ends of the rods 116 are interconnected by a strap 124, and this strap is provided at its upper face with a detent recess 126 (FIGS. 12 and 13). The housing 104 fixedly carries at its underside a bracket 128 on which a detent pin 130 is swingable, and when the strap 124 is lowered, in opposition to the springs 118 to the elevation shown in phantom lines in FIGS. 12 and 13, the detent pin 130 will simply swing by gravity to its vertical position situated directly over the strap 124 and extending into the detent recess 126 thereof. In this way, whenever it is desired to manipulate the support means the operator need only depress the strap 124 until the pin 130 swings over the latter, and then this pin will act to reliably maintain the rods 116 at their lower elevations where they will not interfere with the movement of the handle 112. As soon as one or the other of the positions of the plate 102 has been reached, the operator need only push the pin 130 to one side of the strap 124, and the springs 118 will automatically return the rods 116 to their upper elevation where they extend upwardly beyond the handle 112 so as to reliable hold the support means in the position of FIG. 6 or that of FIG. 7. As is shown in FIGS. 12 and 13, the top wall of the housing 104 is formed with bores which will accommodate the upper ends of the rods 116, so that these rods will reliably extend upwardly across the handle 112.

An additional holding means 132 (FIGS. 4 and 5) is provided for holding the manually operable means 94 in the position to which it is moved when the rotary lock means 72 has been turned to its locking position. This releasable holding means 132 includes an axially bored block 134 fixedly carried by the I-beam of the outrigger and accommodating in its interior a spring 136 which acts on a piston 138 fixed to the end of a rod 140 carrying at its outer end an elongated handle 142 which carries spaced from and extending parallel to the rod 140 a pin 144. Before the manually operable means 94 is displaced to the position shown for the lock 54a in FIG. 4, the handle 142 of the releasable holding means 132 is swung to its upper position extending upwardly from the rod 140, and now the manually operable means 94 is operated so as to assume the position shown at the right in FIG. 4. At this time the handle 142 can be turned back down to a position where it extends across the handle 96, and the pin 144 will become situated beneath the handle 96 while the handle 142 will extend across the latter, so that in this way the handle 94 of the manually operable means 94 is reliably maintained in the position corresponding to the locked position of the rotary lock means. As a result of this construction it is not possible for the rotary lock means to become inadvertently unlocked due to vibrations, for example.

Thus, it will be seen that with the structure of the invention any of the locks which are not to be used will have their manually operable means 94 displaced to the position indicated for the lock 52b in FIG. 4, and at this time the elongated locking end 76 of the rotary lock means 6 of the rotary lock means 72 is in register with the opening 40 as well as with the elongated upper open end 62 of the housing 60, this upper open end 62 having an opening which is somewhat greater than but conforms fairly closely to the configuration of the locking end 76, as is clearly apparent from FIG. 4. Thus, upon displacement of the manually operable means to the position shown for the lock 52b in FIG. 4, the rotary lock means 72 can simply drop to the retracted position shown at the left in FIG. 5. Of course, before this operation takes place the operator will have displaced the support plate 102 into the position shown in FIG. 6 so as to release the rotary lock means 72 for movement by gravity to its retracted position. Thus, the operator will first turn the shank 74 to its unlocking position, then the operator will depress the strap 124 so that the pin 130 swings over the latter, then the operator will shift the handle 112 from the position of FIG. 7 into the position of FIG. 6, and the result will be dropping of the rotary lock means to its retracted position. Before the handle 96 is swung to the position shown at the left in FIG. 4, the handle 142 of the releasable holding means 132 is raised so that the handle 96 is released for movement.

It will thus be seen that the lock structure of the invention is simple and rugged and can be reliably maintained in its locking position while at the same time the rotary lock means can assume a retracted position where it will not interfere with movements which take place over those outriggers which do not participate in the connecting of a container to the trailer.

It will thus be seen that the object set forth above, among those made apparent from the preceding description, are efficiently attained, and, since certain changes may be made in the above constructions without departing from the spirit and scope of the invention, it is intended that all matter contained in the above description or shown in the accompanying drawings shall be interpreted as illustrative and not in a limiting sense.

What is claimed is:

1. A releasable lock comprising:
   rotary lock means having a verticle axis about which said rotary lock means is rotatable, said rotary lock means being axially shiftable between operative and retracted positions and when in said operative position being rotatable about said verticle axis between a locking and an unlocking position,
   manually operable means coacting with said rotary lock means and adapted to rotate said rotary lock means between said locking and unlocking positions,
   a shiftable support means adapted to move horizontally to engage and thereby support said rotary lock means in said locking position only when said rotary lock means is in said locking position and to be moved horizontally away from said rotary lock means to the non-supporting position, when said rotary lock means is to be released, whereby said rotary lock means may be rotated to said unlocking position and then moved axially from said operative to said retracted position, and
   housing means accommodating said rotary lock means for axial movement outwardly of said housing means to said operative position and inwardly toward the interior of said housing means to said retracted position,
   said housing means having an upper open end and a bottom wall formed with an opening passing therethrough, said rotary lock means having an upper locking end of T-shaped configuration movable into and out of said housing means through said upper open end thereof, and said rotary lock means having an elongated shank extending through said opening in said bottom wall of said housing means downwardly beyond the exterior thereof, said housing means carrying at the exterior of said bottom wall thereof around said shank of said rotary lock means a stationary locking cam and said shank carrying beneath said stationary locking cam a rotary locking cam fixed to said shank for rotary movement therewith and coacting with said stationary cam when said rotary lock means is in said operative position for displacing said rotary lock means to said locking position thereof during turning of said rotary lock means by said manually operable means, said lock means including a ring in said housing surrounding and axially movable with respect to said shank and said shank being formed beneath said ring with a shoulder extending beneath said ring to raise the latter with said shank when said rotary lock means is raised from said retracted to said operative position thereof, and a spring situated between said ring and said T-shaped end of said rotary lock means for urging the latter end upwardly away from said ring and for urging said ring toward said shoulder, said shiftable support means being in the form of a plate movable horizontally into said housing means beneath said ring to support the latter when said rotary lock means is in said upper operative position thereof, and said rotary locking cam engaging said stationary locking cam when said rotary lock means is in said upper operative position thereof, said shank having beneath said cam which is carried thereby a projection, and a connecting pin carried by said projection and being spaced from and extending parallel to said shank, said manually operable means including a manually turnable linkage having a handle at one end being formed at its opposite end with an opening through which said connecting pin extends at all times while moving axially with said shank.

2. The locking means as recited in claim 1 and wherein a handle is fixed to and extends from said shiftable support means for enabling the latter to be manually moved horizontally between said supporting and non-supporting positions thereof, a pair of holding rods both of which are located on one side of said handle to maintain said support means in said non-supporting position thereof and both of which are situated on opposite sides of said handle to maintain said support means in said supporting position thereof, spring means coacting with said rods for urging the latter to the elevation of said handle, a strap extending between and connected to said rods for simultaneously displacing them to and from the elevation of said handle, and releasable detent means coacting with said strap for releasably maintaining the latter at a location where said rods are maintained in opposition to said spring means at an elevation lower than said handle.

3. In a vehicle of the type having opposed sides and an elongated bed, wherein said vehicle is adapted to carry a plurality of containers situated in end-to-end relationship on said bed, said vehicle further having a plurality of outriggers fixed to said bed and extending laterally beyond said opposed sides thereof, said outriggers respectively having outer ends situated distant from said sides of said bed and being distributed along said sides in an arrangement providing end outriggers for engaging ends of said containers which are respectively situated at ends of said bed and being distributed along said sides in an engaging ends of containers which are located between said ends of said bed and each of said container ends having a depending housing affixed to a bottom wall of said containers proximate each corner of said bottom container wall, each of said depending housings having an elongated slot through a bottom wall of said housing, and each of said intermediate outriggers carrying in the region of its outer end a depending locking means adapted to be raised and inserted in said elongated slot of said depending housing to thereby lock said container to said intermediate outrigger, the improvement wherein said locking means comprises, a hollow housing having an aperture therethrough which is aligned with said elongated slot in said depending housing, said hollow housing having a bottom wall with a depending cam fixed thereto and surrounding at least a portion of said aperture and, a rotary lock axially moveable in said hollow housing and having an elongated shank with an upper T-shaped locking end and a lower cam ring having an upstanding cam thereon, said rotary lock adapted to be moved upwardly whereby said T-shaped end protrudes through said elongated slot of said depending housing above said bottom wall thereof whereby said upstanding cam is positioned below said bottom wall of said hollow housing proximate said depending cam whereby rotation of said rotary lock will cause said upstanding cam to engage said depending cam on said hollow housing thereby lowering and locking said T-shaped member to said bottom wall of said depending housing.

References Cited

UNITED STATES PATENTS

| | | | |
|---|---|---|---|
| 2,614,871 | 10/1952 | Grizzard et al. | 248—361 X |
| 2,729,417 | 1/1956 | Maynard | 248—361 |
| 3,159,111 | 12/1964 | Gutridge et al. | 105—366 |
| 3,167,028 | 1/1965 | Gutridge et al. | 105—366 |
| 3,331,333 | 7/1967 | Coulson | 105—366 |

LEO FRIAGLIA, Primary Examiner

JOHN A. PEKAR, Assistant Examiner

U.S. Cl. X.R.

105—366; 248—361